US006805331B2

United States Patent
Burrola et al.

(10) Patent No.: US 6,805,331 B2
(45) Date of Patent: Oct. 19, 2004

(54) ELECTROMAGNETICALLY ENERGIZED ACTUATOR

(75) Inventors: Santos Burrola, Chihuahua (MX); Jean-Francois Pelka, El Paso, TX (US); Mahmood Rad, Brookfield, WI (US)

(73) Assignee: Delphi Technologies, Inc., Troy, MI (US)

( * ) Notice: Subject to any disclaimer, the term of this patent is extended or adjusted under 35 U.S.C. 154(b) by 231 days.

(21) Appl. No.: 10/010,423

(22) Filed: Dec. 7, 2001

(65) Prior Publication Data

US 2003/0107016 A1 Jun. 12, 2003

(51) Int. Cl.[7] ............................................. F16K 31/02
(52) U.S. Cl. .................. 251/129.15; 335/236; 335/262
(58) Field of Search ....................... 251/129.15; 335/236, 335/237, 262

(56) References Cited

U.S. PATENT DOCUMENTS

| | | | | |
|---|---|---|---|---|
| 3,379,214 A | * | 4/1968 | Weinberg | .......... 251/129.15 X |
| 3,914,720 A | * | 10/1975 | Drubig | ................... 335/236 X |
| 4,166,991 A | * | 9/1979 | Haner | ......................... 335/261 |
| 4,403,765 A | * | 9/1983 | Fisher | ................ 251/129.15 X |
| 4,826,132 A | * | 5/1989 | Moldenhauer | ........... 251/129.17 |
| 4,901,974 A | * | 2/1990 | Cook et al. | ............ 251/129.15 |
| 5,029,807 A | * | 7/1991 | Fuchs | ........................... 251/65 |
| 5,072,752 A | * | 12/1991 | Kolchinsky | ................ 137/493 |
| 5,143,345 A | * | 9/1992 | Miki et al. | .......... 251/129.15 X |
| 5,237,980 A | * | 8/1993 | Gillier | ................ 251/129.15 X |
| 5,467,961 A | * | 11/1995 | Sausner et al. | ........ 251/129.15 |
| 5,752,689 A | * | 5/1998 | Barkhimer et al. | .... 251/129.15 |
| 6,373,363 B1 | | 4/2002 | Spakowski et al. | ......... 335/256 |
| 6,538,543 B2 | | 3/2003 | Bircann et al. | ............. 335/220 |
| 6,615,780 B1 | | 9/2003 | Lin et al. | ................. 123/90.17 |

OTHER PUBLICATIONS

Richard Van Ryper, "Using Advance Material to Improve Automotive Part Life," The DuPont Company, Technical Paper Series, Aug. 1996.

* cited by examiner

Primary Examiner—Gene Mancene
Assistant Examiner—Eric Keasel
(74) Attorney, Agent, or Firm—Jimmy L. Funke

(57) ABSTRACT

An electromagnetically energized actuator featuring low friction, low wear, low impact and low noise attributes. The actuator includes a polymer tube, a stop fixedly disposed in the tube and composed of a highly permeable material, a plunger reciprocably disposed within the tube and composed of a highly permeable material, a spring assembly including a spring which is formed at the facing ends the stop and the plunger which spring serves to bias the plunger away from the stop, a first plate composed of a highly permeable material which is connected to a first end of the tube, and a second plate composed of a highly permeable material which is connected to a second end of the tube. The tube is composed of a polymer which (relative to a conventional brass tube) allows tighter tolerances between the plunger and the tube resulting in lower wear, less sliding noise, reduction in corrosion, and elimination of thinned end of the tube. The preferred tube polymer is VESPEL® with TEFLON® mixture.

8 Claims, 3 Drawing Sheets

ELECTROMAGNETICALLY ENERGIZED ACTUATOR

TECHNICAL FIELD

The present invention relates to electromagnetically energized actuators, and more particularly to an electromagnetically energized actuator configured for minimization of plunger friction and plunger impact.

BACKGROUND OF THE INVENTION

A conventional pneumatic valve 10 is depicted at FIGS. 1 through 2 in which an electromagnetically energized actuator used to control flow of fuel vapors from a canister to the engine intake manifold. The conventional pneumatic valve 10 includes a housing 12, an electromagnet assembly 14 which includes a solenoid 14a wound on a spool 14b, a brass tube 16 concentrically disposed relative to the spool, a stop 18 fixedly disposed in the tube and composed of a highly permeable material, a plunger 20 reciprocally disposed within the tube and composed of a highly permeable material, a spring 22 of a spring assembly 24 formed at the facing ends 18f, 20f of the stop and the plunger which biases the plunger away from the stop, and a valve seat 26 located on the plunger at an end thereof distal from the aforementioned facing end. The combination of the plunger, the stop, the spring assembly a first plate 32 and a second plate 34, as shown at FIG. 2, constitutes a conventional electromagnetically energized actuator 38.

When the solenoid is energized, the plunger is magnetically pulled toward the stop, overcoming the biasing by the spring such that the facing end of the plunger moves toward the facing end of the stop, with the consequence that the valve seat is opened. When the solenoid is de-energized, the spring pushes the plunger away from the stop, thereby again closing the valve seat.

Energization/de-energization of the solenoid 14a is current (voltage) source 28 regulated, for example, by a pulse width modulated (PWM) signal generated from a microprocessor 30, wherein the programming thereof is designed, for example, for enhanced evaporative emission control to meet EPA emissions regulations, and provides precision flow at low PWM duty cycles to maintain the correct air-fuel mixture at low engine speeds. Moreover, the pulse width modulation is used to control the flow through the purge system with typical frequency ranges from 8 to 100 Hz.

In the aforementioned example, the microprocessor is used to generate the PWM signal of the solenoid so as to supply full voltage to the circuit long enough to allow the solenoid to energize. Once the solenoid is energized, the state of the valve changes from OFF to ON allowing full airflow through the valve (for a normally closed valve), and when the pulse ends the valve returns to its normal state (OFF). The duty cycle determines the percentage of time that the valve is energized providing a way to adjust the flow rate required.

As mentioned, the plunger moves toward the stop due to the magnetic force created by the energized solenoid, wherein the magnetic flux flows through the magnetic package, through the first and second plates and through the plunger and through stop. This change of the position of the plunger regulates, via the valve, the flow of air through the system. When the magnetic force disappears, the spring located between the stop and plunger pushes the plunger against the valve seat with enough force to maintain a good seal at the valve, shutting off the flow when no purge is required.

As plunger moves back and forth (reciprocates) while operating, two main problems emerge.

The first problem relates to the tube 16. Friction between the plunger and the tube occurs as the plunger slidingly reciprocates therealong. The tube is composed of brass which wears over a lifetime of millions of reciprocation cycles. This wear leads to reduced durability and adversely affects the over-all reliability of the pneumatic valve. A conventional redress to this wear problem (and also to prevent tube scratching and oxidation of the plunger) is to TEFLON® coat the plunger using, for example, EMRALON 334. However, this is an extra manufacturing step which does not eliminate the problem. Problems related to the brass tube include wide tolerances, plunger sliding noise, and corrosion. Additionally, as can be seen best at FIG. 2, the tube 16 is mounted to opposing first and second plates 32, 34 with respect to the housing 12. At the first plate 32, the tube has a thinned end 36 having a uniformly reduced cross-sectional thickness, which involves yet another added manufacturing step.

The second problem relates to plunger impact. With each reciprocation, the plunger is caused by the co-action of the solenoid and spring to impact at its ends of travel. This impacting results in undesirable noise generation and undesirable wear when the plunger hits the valve seat and the stop. This condition is made worse at low temperatures (ie., below about −10 degrees C.). Related to this problem is the excessive amount of magnetic energy stored in the solenoid. This arises because the secondary air gap $G_S$ between the first plate 32 and the plunger 20 is constant (basically being about the thickness of the thinned end 36) even as the plunger reciprocates, the only factor affecting the reluctance is the change in area of the plunger within the first plate 32, which area change is not significant enough to substantially increase the reluctance at the secondary air gap, wherein the relation for reluctance, A, at the secondary air gap, $G_S$, is given by:

$$\Re = l/\mu A,$$

where $\mu$ is the permeability of the secondary air gap, l is the uniform separation distance between the plunger and the first plate which coincides with the thickness of the tube sidewall at the thinned end 36, and A is the area of the plunger within the first plate). With the reluctance at the secondary air gap $G_S$ remaining about the same, and with the reluctance at the primary air gap $G_P$ between the facing ends of the plunger and the stop, the stored magnetic energy causes the plunger to impact forcefully and also tends to retard the ability of the spring to effect fast valve closure, and also tends to retard the ability of the magnetic field to effect fast valve opening.

Accordingly, what remains needed in the art is an electromagnetically energized actuator which has low friction, low wear, low impact, and low noise attributes.

SUMMARY OF THE INVENTION

The present invention is an improved electromagnetically energized actuator featuring low friction, low wear, low impact and low noise attributes.

The improved electromagnetically energized actuator according to the present invention includes a polymer tube, a stop fixedly disposed in the tube and composed of a highly permeable material, a plunger reciprocally disposed within the tube and composed of a highly permeable material, a spring assembly including a spring which is formed at the facing ends the stop and the plunger which spring serves to bias the plunger away from the stop, a first plate composed of a highly permeable material which is connected to a first end of the tube, and a second plate composed of a highly permeable material which is connected to a second end of the tube.

In an example of an environment of operation, the electromagnetically energized actuator according to the present invention is disposed in a pneumatic valve including a housing, an electromagnet assembly including a solenoid, and a valve seat. The first and second plates are connected to the housing and form part of the electromagnet assembly, and the valve seat is located at an end of the plunger distal from the aforementioned facing end thereof. The plunger is reciprocal between a first position (responsive to biasing by the spring) and a second position responsive to energization of the solenoid (which overcomes the biasing of the spring). The electromagnetically energized actuator according to the present invention may be used in devices other than a pneumatic valve, which is merely presented herein as an exemplification of use.

The tube is composed of a polymer which (relative to a conventional brass tube) allows tighter tolerances between the plunger and the tube resulting in lower wear, less sliding noise, reduction in corrosion, and elimination of thinned end of the tube. The preferred tube polymer is VESPEL® (a polyimide material) with TEFLON® (a fluoropolymer resin material) mixture (most preferred), or VESPEL, both are trademarks of and available through The DuPont Company of Wilmington, Del. 19880. These polymers have very good mechanical and chemical properties, including a favorable wear rate and thermal coefficient of expansion, as detailed in "Using Advanced Materials to Improve Automotive Part Life by Richard Van Ryper, The DuPont Company, August, 1996, hereby incorporated herein by reference. For example, an advantage of these polymers, particularly the VESPEL with TELFLON mixture, is self lubrication which tends to protect the plunger in such a manner that the existing plunger coating material could be changed to nickel resulting in tighter tolerances capability, lower friction forces resulting in less plunger wear and higher corrosion resistance, with the attendant advantage of long term failure-free performance. The reduced clearance between the tube and the plunger also improves alignment of the plunger with the valve seat, reducing wear and noise.

The polymer tube is partly received into a recess formed at an opening of the first plate, wherein the non-recessed portion of the opening is proximally spaced from the plunger when it is located at its first position. Because of the recess, a compound secondary air gap is thus formed at the opening, including a first gap component at the non-recessed portion of the opening across a small spacing separating the first plate from the plunger, and a second gap component between the first plate and the plunger at the recess portion of the opening across the thickness of the sidewall of the tube. At the first position, the magnetic energy through the plunger is large when the solenoid is energized, thereby delivering an initially high magnetic force on the plunger to overcome the spring biasing. However, as the plunger moves toward the stop, the area of the plunger proximate the first plate at the compound secondary air gap becomes smaller, whereupon the reluctance of the magnetic circuit increases at the compound secondary air gap even as the reluctance between the plunger and the stop at the primary air gap is rapidly decreasing as the plunger comes into proximity with the stop. The moderation of the magnetic circuit reluctance keeps the magnetic energy from increasing rapidly and thereby dampens the plunger impact at the stop, for example by 35% over the conventional electromagnetically energized actuator shown at FIG. 2. This also has the benefit that duty cycles of the solenoid energization will be more efficient: more magnetic force initially will ensure a rapid, firm start of reciprocation of the plunger when at the first position, whereas as the magnetic circuit energy dissipates with increasing secondary air gap reluctance as the plunger reaches the second position. Accordingly, the spring response time is improved, whereby the plunger is returned more quickly upon de-energization of the solenoid.

Accordingly, it is an object of the present invention to provide an electomagnetically energized actuator featuring low friction, low wear, low impact and low noise attributes.

This and additional objects, features and advantages of the present invention will become clearer from the following specification of a preferred embodiment.

DESCRIPTION OF THE PREFERRED EMBODIMENT

Figure 1:
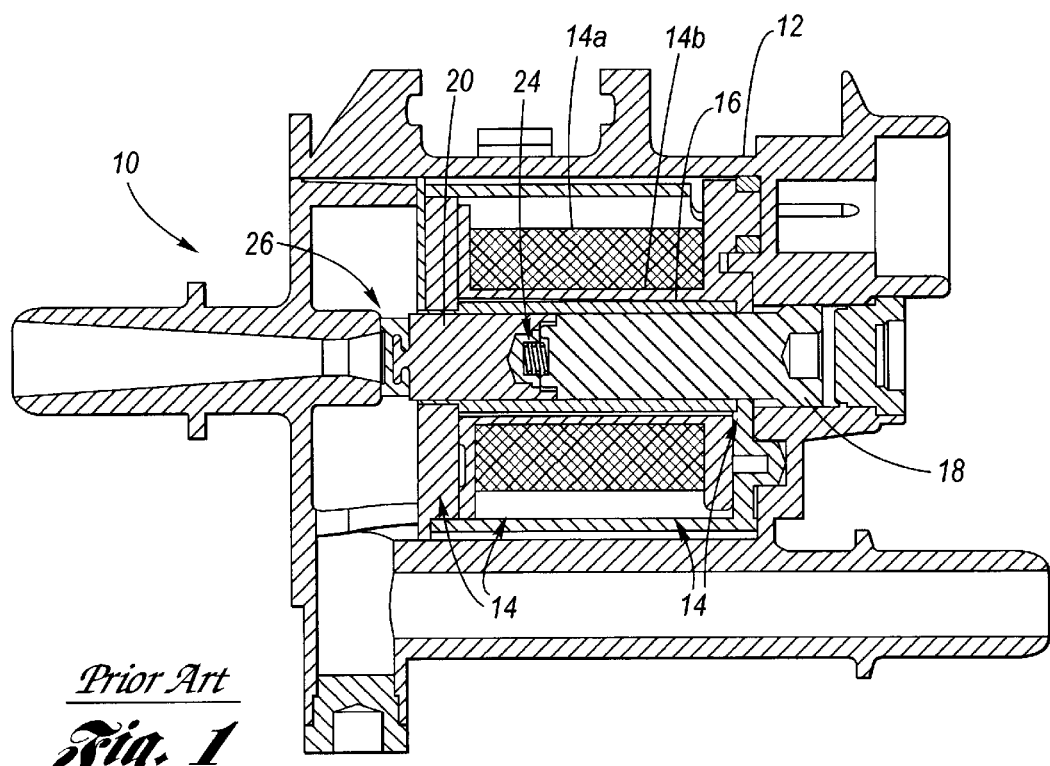
FIG. 1 is a sectional side view of a prior art pneumatic valve.

Referring now to the Drawing, FIGS. 3 through 6 depict an example of an electromagnetically energized actuator 100 according to the present invention. The electromagnetically energized actuator 100 may, for example, be used in a pneumatic valve as depicted at FIGS. 1 and 1A in substitution for the conventional electromagnetically energized actuator thereof (as also shown at FIG. 2), or may be used in other device applications.

The electromagnetically energized actuator 100 includes a plunger 102, a stop 104, a first plate 106 having a first plate opening 106a, a second plate 108 having a second plate opening 108a, and a polymer tube 110 extending between the first and second plate openings and into which is reciprocally situated the plunger and stationarily situated the stop. The plunger 102, the stop 104, the first plate 106 and the second plate 108 are each composed of highly permeable material (ie., ferromagnetic material). The plunger 102 and the stop 104 are preferably of cylindrical cross-section. A spring 112 of a spring assembly 114 formed at the facing ends 102f, 104f respectively of the stop and the plunger biases the plunger 102 away from the stop 104.

Figure 1A:
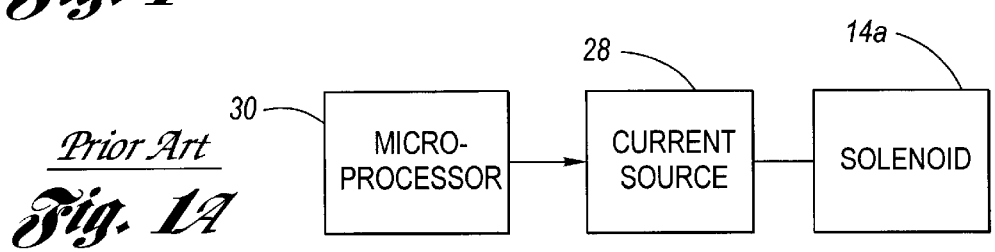
FIG. 1A is a schematic diagram of an electrical control circuit for the prior art pneumatic valve of FIG. 1.
Figure 2:
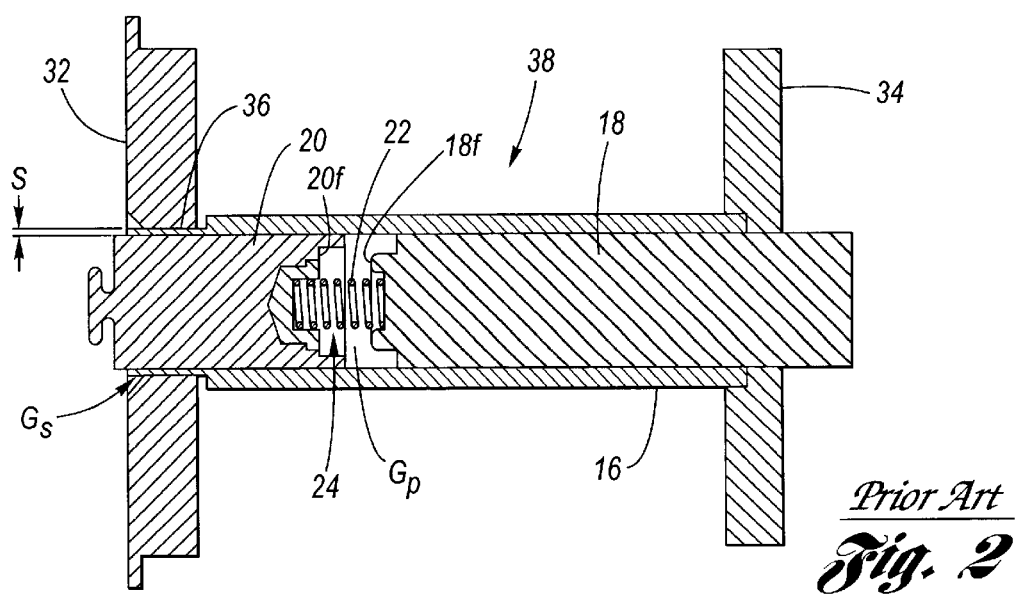
FIG. 2 is a sectional side view of the prior art electromagnetically energized actuator of the pneumatic valve of FIG. 1.

The first and second plates 106, 108 form part of an electromagnetic circuit which includes a selectively energizable solenoid, as for example the solenoid 14a shown at FIG. 1. With the magnetic circuit so provided, the magnetic flux B from the solenoid (see 14a in FIG. 1) passes through the first plate 106, crosses a compound secondary air gap $G_S'$ between the first plate and the plunger 102, through the plunger, across a primary air gap $G_P'$ to the stop 104, through the stop, and into the second plate 108.

Figure 3:
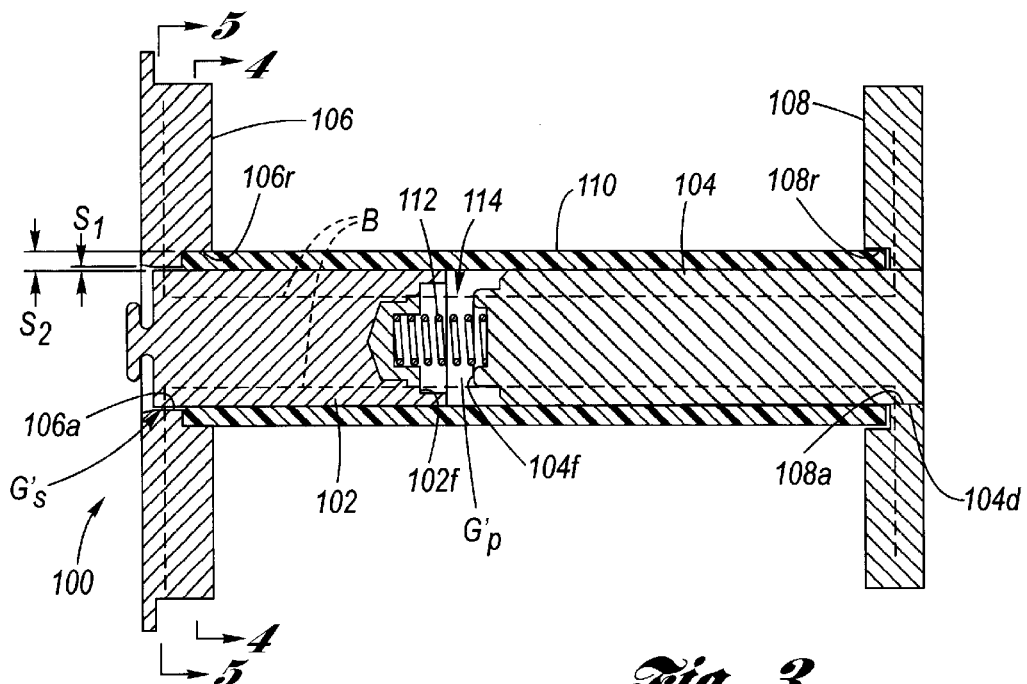
FIG. 3 is a sectional side view of an electromagnetically energized actuator according to the present invention, wherein the plunger thereof is shown at a first position.
Figure 4:
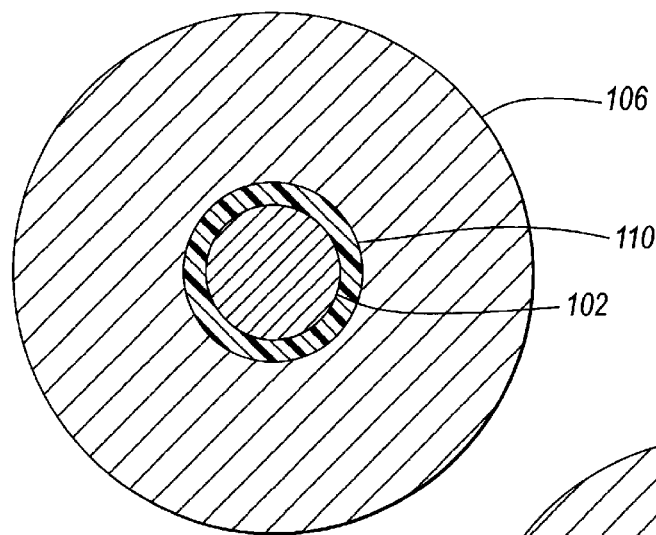
FIG. 4 is a sectional end view seen along line 4—4 of FIG. 3.
Figure 5:
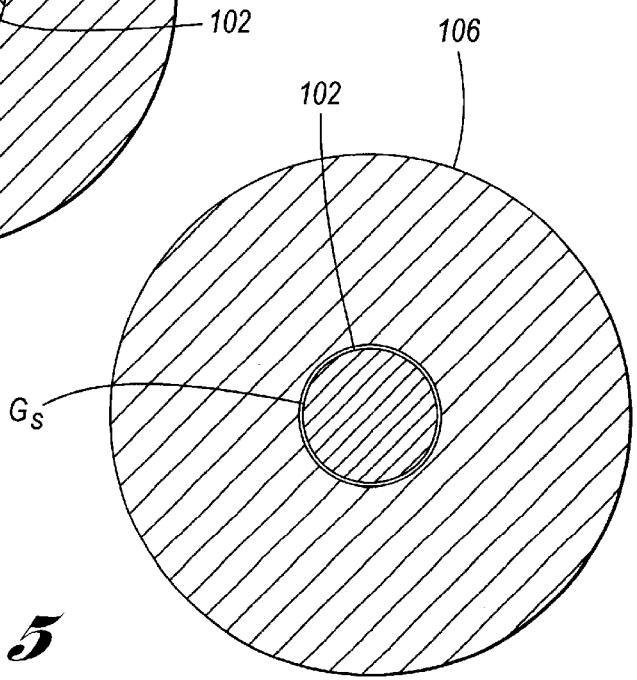
FIG. 5 is a sectional end view seen along line 5—5 of FIG. 3.
Figure 6:
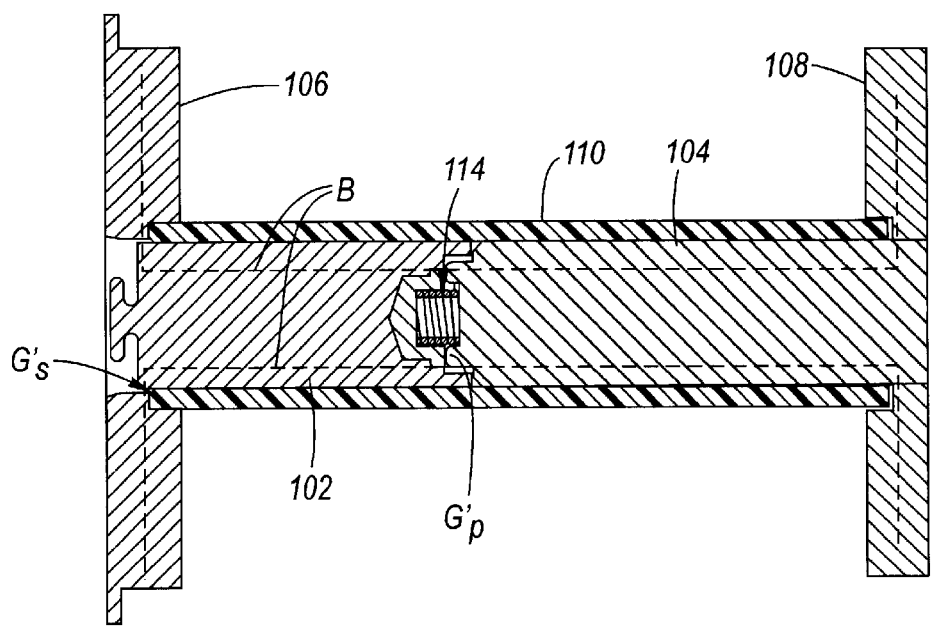
FIG. 6 is a sectional side view of an electromagnetically energized actuator according to the present invention, wherein the plunger thereof is shown at a second position.
Figure 7:
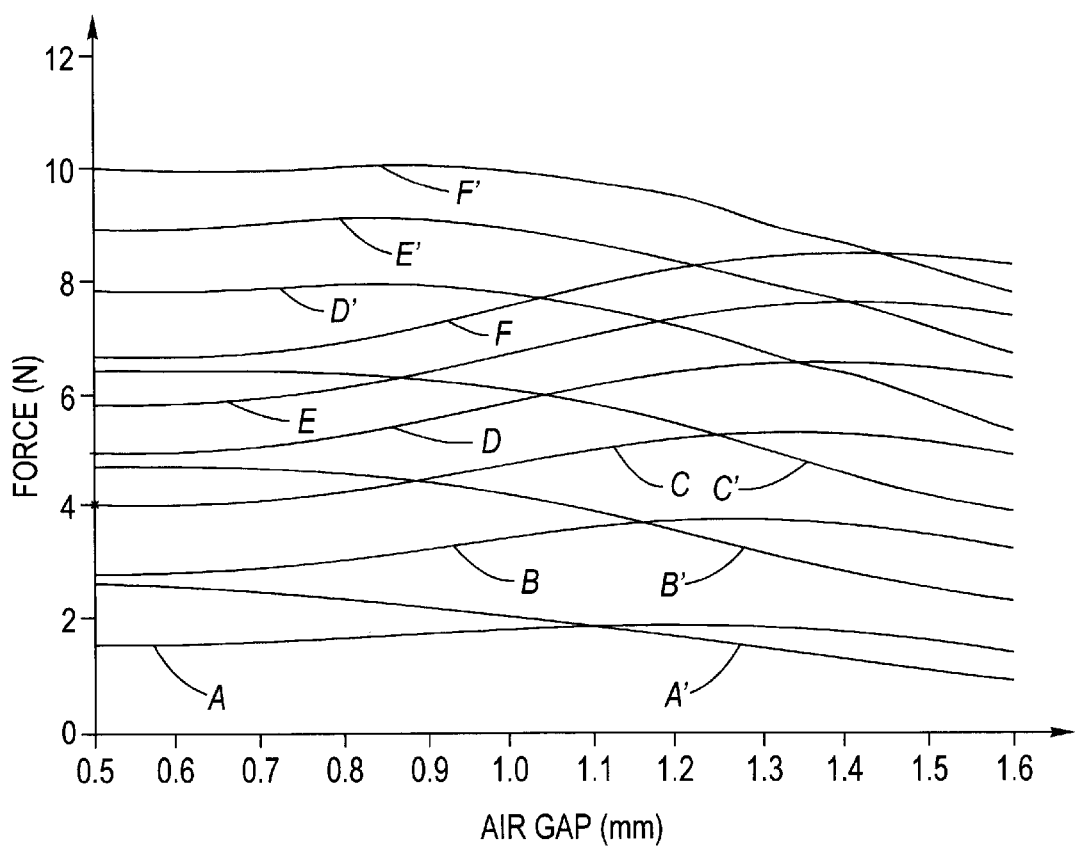
FIG. 7 is a graph of plunger force between the plunger and the stop of the electromagnetically energized actuator of FIG. 3, and, for comparison for optimization purposes, the electromagnetically energized actuator of FIG. 2.

The plunger 102 is reciprocal along the inside of the tube 110 between a first position, shown at FIG. 3, responsive to biasing by the spring, and a second position, shown at FIG. 7, responsive to energization of the solenoid (which overcomes the biasing of the spring).

The openings 106a, 108a of the first and second plates 106, 108 include respective recesses 106r, 108r into which respective ends of the tube 110 are received. Each recess 106r, 108r extends less than the thickness of the respective plate. For example, recess 106r may extend about one-half the thickness of the first plate, and the second recess 108r may extend about one-third the thickness of the second plate.

In the case of the magnetic circuit interface between the first plate 106 and the plunger 102, when the plunger is at its first position, as shown at FIG. 3, the compound secondary air gap $G_S'$ has a first gap component $G_{S1}$ characterized by a first separation distance $S_1$ generally just sufficient so as to allow clearance of the plunger as it reciprocates, and further has a second gap component $G_{S2}$ characterized by a second separation distance $S_2$ generally equal to the thickness of the sidewall of the tube 16.

The reluctance, $\Re$, between the plunger and the first plate when the plunger is at the first position is given by:

$$\Re = \Re + \Re,$$

wherein $\Re$ is the reluctance across the first gap component at the first position, and $\Re$ is the reluctance across the second gap component at the first position, and wherein $\Re \ll \Re$ such that nearly all the magnetic flux passes through the first gap component and very little passes through the second gap component.

When the plunger 102 is at its second position, as shown at FIG. 7, only a small area of the plunger 102 is separated from the first plate at the first gap component. Now the reluctance, $\Re$ between the plunger and the first plate when the plunger is at the second position is given by:

$$\Re = \Re' + \Re',$$

wherein $\Re'$ is the reluctance across the first gap component at the second position, and $\Re'$ is the reluctance across the second gap component at the second gap component, and wherein $\Re < \Re$ and generally $\Re$ is approximately equal to $\Re$.

In the case of the magnetic circuit interface between the second plate 108 and the stop 104, a distal stop end 104d of the stop is fixedly attached to the second plate 106 such that a very low reluctance magnetic interface is provided therebetween (ie., the stop touches a large area of the second plate not sheathed by the tube).

The tube is composed of a polymer which (relative to a conventional brass tube) allows tighter tolerances between the plunger and the tube resulting in lower wear, less sliding noise, reduction in corrosion, and elimination of tube flaring. The preferred tube polymer is VESPEL®with TEFLON® mixture (most preferred), or VESPEL, both trademarks of and available through The DuPont Company of Wilmington, Del. 19880, as mentioned hereinabove. These polymers have very good mechanical and chemical properties as also mentioned hereinabove, including a favorable wear rate and thermal coefficient of expansion, as also mentioned hereinabove, including self lubrication which tends to protect the plunger in such a manner that the existing plunger coating material could be changed to nickel resulting in less wear. The afforded clearance reduction between the tube and plunger eliminates oxidation with the attendant advantage of long term failure-free performance. The reduced clearance between the tube and the plunger improves alignment of the plunger with the valve seat, reducing wear and noise.

In operation, the plunger is at the first position as shown at FIG. 3 in response to biasing by the spring. Because the tube is partly received into the first plate, a portion of the first plate is proximally spaced from the plunger when located at the first position, whereat the magnetic energy through the plunger is large when the solenoid is energized, thereby delivering an initially high magnetic force on the plunger to overcome the spring biasing. However, as the plunger moves toward the stop, the area of the plunger proximate the first plate becomes small, whereupon the reluctance of the magnetic circuit increases at the secondary air gap even as the reluctance at the primary air gap is rapidly decreasing as the facing ends 106f, 108f approach contact, thereby dampening the plunger impact at the stop.

The moderation of the magnetic circuit reluctance keeps the magnetic energy from increasing rapidly and thereby dampens the plunger impact at the stop, for example by 35% over the conventional electromagnetically energized actuator which is shown at FIG. 2. This also has the benefit that duty cycles of the solenoid energization will be more efficient: more magnetic force initially will ensure a rapid, firm start of reciprocation of the plunger when at the first position, whereas as the magnetic circuit energy dissipates with increasing secondary air gap reluctance as the plunger reaches the second position, the spring response time is improved, whereby the plunger is returned more quickly upon de-energization of the solenoid.

The criteria according to the present invention to provide a low impact to the plunger at the second position, the first position of the plunger must be located at the outer edge, or just inside, the first plate, and the area of the plunger at the secondary air gap must be optimized. FIG. 7 depicts the nature of this optimization.

FIG. 7 is a graph of force on the plunger at the primary air gap $G_P$ as a function of the length of the primary air gap (which is maximum when the plunger is at the first position and approaches zero as the plunger approaches the second position). The curves A, B, C, D and E are for magnetic fluxes of 400, 600, 800, 1,000, 1,200 and 1,400 Ampere-turns, respectively, for an electromagnetically energized actuator 100 according to the present invention, as shown at FIG. 3. Optimization of the first position of the plunger is made by comparing curves A, B, C, D and E with curves A', B', C', D' and E', wherein curves A', B', C', D' and E' are for magnetic fluxes of 400, 600, 800, 1,000, 1,200 and 1,400 Ampere-turns, respectively, for an electromagnetically energized actuator 38 according to the conventional, prior art design, as shown at FIG. 2. It will be seen, for example by inspecting the curve pair composed of Curve A and Curve A', that as the primary air gap disappears, the force on the plunger becomes smaller for Curve A as compared to Curve A'. Further, for an air gap of between about 1.3 mm and 1.5 mm an optimized first position of the plunger is provided whereat the initial force of Curve A exceeds that of Curve A'.

Similarly, the other curve pairs may be compared for optimization.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. An electromagnetically energized actuator comprising:
   a tube having a first end and an opposite second end;
   a first plate having an opening, said first plate being connected to said first end of said tube at said opening;
   a second plate connected to said second end of said tube;
   a stop composed of a high permeability material, said stop being stationarily located in said tube and having a low reluctance magnetic interface with said second plate;
   a plunger composed of a high permeability material, said plunger being reciprocally located in said tube such that said plunger is reciprocal between a first position and a second position, said plunger having a magnetic interface with said first plate characterized at said opening by a compound secondary air gap, said compound secondary air gap comprising a first gap component and a second gap component, wherein when said plunger is at said first position said compound secondary air gap has a first position reluctance comprising said first gap component having a first reluctance and said second gap component having a second reluctance, wherein said first reluctance is much smaller than said second reluctance; and
   a spring assembly located between said plunger and said stop which biases said plunger away from said stop;
   wherein a magnetic circuit is defined between said first plate and said second plate, said magnetic circuit including said plunger, said stop, a primary air gap between said plunger and said stop, and said compound secondary air gap between said plunger and said first plate; and
   wherein said first plate has a recess at said first opening, said tube having a substantially uniform tube sidewall thickness, said recess having a depth substantially equal to said tube sidewall thickness, said tube being inserted into said recess, and wherein said recess forms said second gap component.

2. The actuator of claim 1, wherein said tube comprises a polymer tube.

3. The actuator of claim 2, wherein said polymer comprises a polyimide material.

4. The actuator of claim 2, wherein said polymer comprises a polyimide material mixed with a fluoropolymer resin.

5. The actuator of claim 1, wherein said first plate has a plate thickness perpendicular to said depth, wherein said recess extends into said first plate substantially one-half of said plate thickness.

6. The actuator of claim 5, wherein said tube comprises a polymer tube.

7. The actuator of claim 6, wherein said polymer a polyimide material.

8. The actuator of claim 6, wherein said polymer comprises a polyimide material mixed with a fluoropolymer resin.

* * * * *